US009680593B2

(12) United States Patent
Jung et al.

(10) Patent No.: US 9,680,593 B2
(45) Date of Patent: Jun. 13, 2017

(54) APPARATUS AND METHOD FOR RECEIVING SIGNAL IN WIRELESS COMMUNICATION SYSTEM

(75) Inventors: Young-Seok Jung, Suwon-si (KR); Jong-Han Lim, Seoul (KR); In-Hyoung Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 475 days.

(21) Appl. No.: 13/343,114

(22) Filed: Jan. 4, 2012

(65) Prior Publication Data

US 2012/0320729 A1 Dec. 20, 2012

(30) Foreign Application Priority Data

Jun. 14, 2011 (KR) .................. 10-2011-0057518

(51) Int. Cl.
*H04J 11/00* (2006.01)
*H04L 25/02* (2006.01)

(52) U.S. Cl.
CPC ...... *H04J 11/0066* (2013.01); *H04L 25/0232* (2013.01)

(58) Field of Classification Search
CPC .................. H04J 11/0066; H04L 25/0232
USPC ........... 455/550.1, 296, 435.1; 370/203, 201, 370/208; 375/295, 260, 267, 340
See application file for complete search history.

(56) References Cited

U.S. PATENT DOCUMENTS 7,068,593 B2* 6/2006 Cho et al. ............... 370/208
7,310,286 B1* 12/2007 Jarvis ................. H04B 13/02
340/850

7,436,759 B2* 10/2008 Hayashi ............. H04L 25/022
370/208
2003/0072254 A1 4/2003 Ma et al.
2004/0218520 A1 11/2004 Aizawa
2007/0010226 A1* 1/2007 Laroia .................. H04B 1/12
455/296

(Continued)

FOREIGN PATENT DOCUMENTS

CN 1439198 A 8/2003
CN 1521970 A 8/2004

(Continued)

OTHER PUBLICATIONS

J. Kim, et al., Inter-subcarrier interference compensation in the frequency-hopped single-carrier frequency division multiple access communication system, IET Communications, vol. 4, Iss. 12, pp. 1443-1451, Aug. 13, 2010.

(Continued)

*Primary Examiner* — Andrew Lai
*Assistant Examiner* — Jamaal Henson
(74) *Attorney, Agent, or Firm* — Jefferson IP Law, LLP

(57) ABSTRACT

A technique for avoiding reception performance deterioration caused by a tone interference that occurs at a position carrying a pilot signal in a wireless communication system is provided. A receiving end includes an operator for converting a time-axis signal into a frequency-axis signal, an extractor for generating channel values in positions carrying pilot signals among the frequency-axis signals, a compensator for compensating for a channel value of a position at which tone interference occurs by using at least one channel value of a position at which no tone interference occurs among the channel values.

30 Claims, 11 Drawing Sheets

(56) References Cited

U.S. PATENT DOCUMENTS

| | | | |
|---|---|---|---|
| 2007/0121571 A1* | 5/2007 | Doberstein | H04B 7/2643 370/350 |
| 2007/0133716 A1* | 6/2007 | Kim | H04H 20/57 375/340 |
| 2007/0159959 A1 | 7/2007 | Song et al. | |
| 2007/0230601 A1* | 10/2007 | Yim | H04L 5/0048 375/260 |
| 2009/0080402 A1* | 3/2009 | Imamura | H04B 7/0842 370/343 |
| 2009/0203377 A1* | 8/2009 | Kawasaki | 455/435.1 |
| 2009/0323791 A1* | 12/2009 | Yee | 375/224 |
| 2010/0040159 A1 | 2/2010 | Lee et al. | |
| 2010/0056067 A1* | 3/2010 | Kim et al. | 455/69 |
| 2010/0189202 A1* | 7/2010 | Imao | 375/344 |
| 2010/0316110 A1* | 12/2010 | Choi | H04L 1/0065 375/232 |
| 2011/0002277 A1* | 1/2011 | Lindoff | H04J 11/004 370/329 |
| 2012/0014477 A1* | 1/2012 | Ko | H04B 7/0613 375/299 |
| 2012/0320729 A1* | 12/2012 | Jung | H04L 25/0232 370/201 |
| 2013/0040676 A1* | 2/2013 | Kang et al. | 455/509 |
| 2016/0100327 A1 | 4/2016 | Jagger et al. | |

FOREIGN PATENT DOCUMENTS

| | | | |
|---|---|---|---|
| CN | 101808053 A | | 8/2010 |
| CN | 102035764 A | | 4/2011 |
| CN | 102098258 A | | 6/2011 |
| EP | 1 819 120 A1 | | 2/2007 |
| JP | 2009-044364 A | | 2/2009 |
| KR | 2010036681 A | * | 4/2010 |
| TW | 200737795 A | | 10/2007 |
| WO | 2010/114269 A2 | | 10/2010 |
| WO | 2010/122818 A1 | | 10/2010 |

OTHER PUBLICATIONS

Tingting Zhao et al. "A Frequency-Domain Estimation Scheme for Single-Tone Interference in OFDM Systems" Communication and Mobile Computing (CMC) 2011 Third International Conference on, IEEE, Apr. 18, 2011, pp. 409-412, XP031951290.

* cited by examiner

APPARATUS AND METHOD FOR RECEIVING SIGNAL IN WIRELESS COMMUNICATION SYSTEM

PRIORITY

This application claims the benefit under 35 U.S.C. §119(a) of a Korean patent application filed in the Korean Intellectual Property Office on Jun. 14, 2011 and assigned Serial No. 10-2011-0057518, the entire disclosure of which is hereby incorporated by reference.

BACKGROUND OF THE INVENTION

1. Field of the Invention

The present invention relates to a wireless communication system. More particularly, the present invention relates to an apparatus and method for receiving a signal in the wireless communication system.

2. Description of the Related Art

A high-order modulation scheme is used for effective use of frequency resources. In this case, a receiver that uses coherent demodulation is generally necessary. Channel estimation is required for the coherent demodulation. For the channel estimation, a signal equally known to a transmitting end and a receiving end (e.g., a pilot signal) is transmitted from the transmitting end to the receiving end. Because the receiving end knows a Transmission (Tx) value of the pilot signal, channel estimation can be performed by using a Reception (Rx) value of the pilot signal.

An Orthogonal Frequency Division Multiplexing (OFDM)/Orthogonal Frequency Division Multiple Access (OFDMA) scheme primarily adopted in a $4^{th}$ Generation (4G) communication system such as 3rd Generation Partnership Project Long Term Evolution (3GPP LTE), Worldwide Interoperability for Microwave Access (WiMAX), etc., can effectively handle a multipath through simple implementation. To increase spectral efficiency, the receiving end of the current communication system transmits the pilot signal to support the coherent demodulation.

A typical communication system transmits a signal in the following manner. Cyclic Redundancy Check (CRC) is used to detect an error that occurs in a transmission process, and Forward Error Correction (FEC) is used to correct the error. Channel-coded bits are subjected to rate matching to match to the number of modulation symbols allocated to each user, and thereafter mapped to a signal constellation. Then, a signal (e.g., a pilot signal, a reference signals, etc.) which is pre-known to the transmitting end and the receiving end and which is used for channel estimation is generated. An information signal and a pilot signal are deployed along a frequency axis, are converted into a time-axis signal by performing an Inverse Fast Fourier Transform (IFFT) operation, and are then transmitted.

In contrast to the aforementioned signal transmission process, a signal reception process is performed as follows. A time-axis signal is converted into a frequency-axis signal by performing a Fast Fourier Transform (FFT) on a signal received through an Rx antenna. An Rx signal corresponding to a position of the pilot signal is extracted, and a channel value of a position carrying data is estimated by using a channel component detected from the Rx signal. Thereafter, the Rx signal of the position carrying the data is demodulated and decoded on the basis of the channel estimation value.

As described above, coherent detection based on the pilot signal can be performed. Narrow-band interference having an effect in a subcarrier unit may be a concern during design and/or manufacture of user equipment. For example, narrow-band interference may occur due to power wiring, inadequate shielding, inadequate grounding of microphone or sensor cables, placement of the microphones or sensors near power lines or transformers, or the like. The narrow-band interference having an effect in the subcarrier unit may be referred to as 'tone interference'. If the tone interference occurs at a position of the pilot signal, an error occurs in a channel estimation process, thereby causing significant performance deterioration. For example, in case of an LTE system, if the tone interference is present, the positions of the pilot signal and the tone interference coincide with each other with a probability of ⅙ in a one Tx antenna system, and the positions of the pilot signal and the tone interference coincide with each other with a probability of ⅓ in a two or more Tx antenna system.

Accordingly, there is a need for a method for improving performance deterioration caused by the tone interference in a wireless communication system that performs demodulation by using the pilot signal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for improving reception performance deterioration caused by tone interference in a wireless communication system.

Another aspect of the present invention is to provide an apparatus and method for compensating for a channel value for a pilot signal that experiences tone interference in a wireless communication system.

Another aspect of the present invention is to provide an apparatus and method for detecting a position at which tone interference occurs in a wireless communication system.

In accordance with an aspect of the present invention, a receiving end apparatus in a wireless communication system is provided. The apparatus includes an operator for converting a time-axis signal into a frequency-axis signal, an extractor for generating channel values in positions carrying pilot signals among the frequency-axis signals, a compensator for compensating for a channel value of a position at which the tone interference occurs by using at least one channel value of a position at which no tone interference occurs among the channel values.

In accordance with another aspect of the present invention, a method of operating a receiving end in a wireless communication system is provided. The method includes converting a time-axis signal into a frequency-axis signal, generating channel values in positions carrying pilot signals among the frequency-axis signals, compensating for a channel value of a position at which the tone interference occurs by using at least one channel value of a position at which no tone interference occurs among the channel values.

In accordance with another aspect of the present invention, a method for an operation of a receiving end in a wireless communication system is provided. The method includes generating channel values in positions carrying pilot signals among channel values carrying information signals, and compensating for tone interference by compensating at least one channel value at which tone interference occurs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
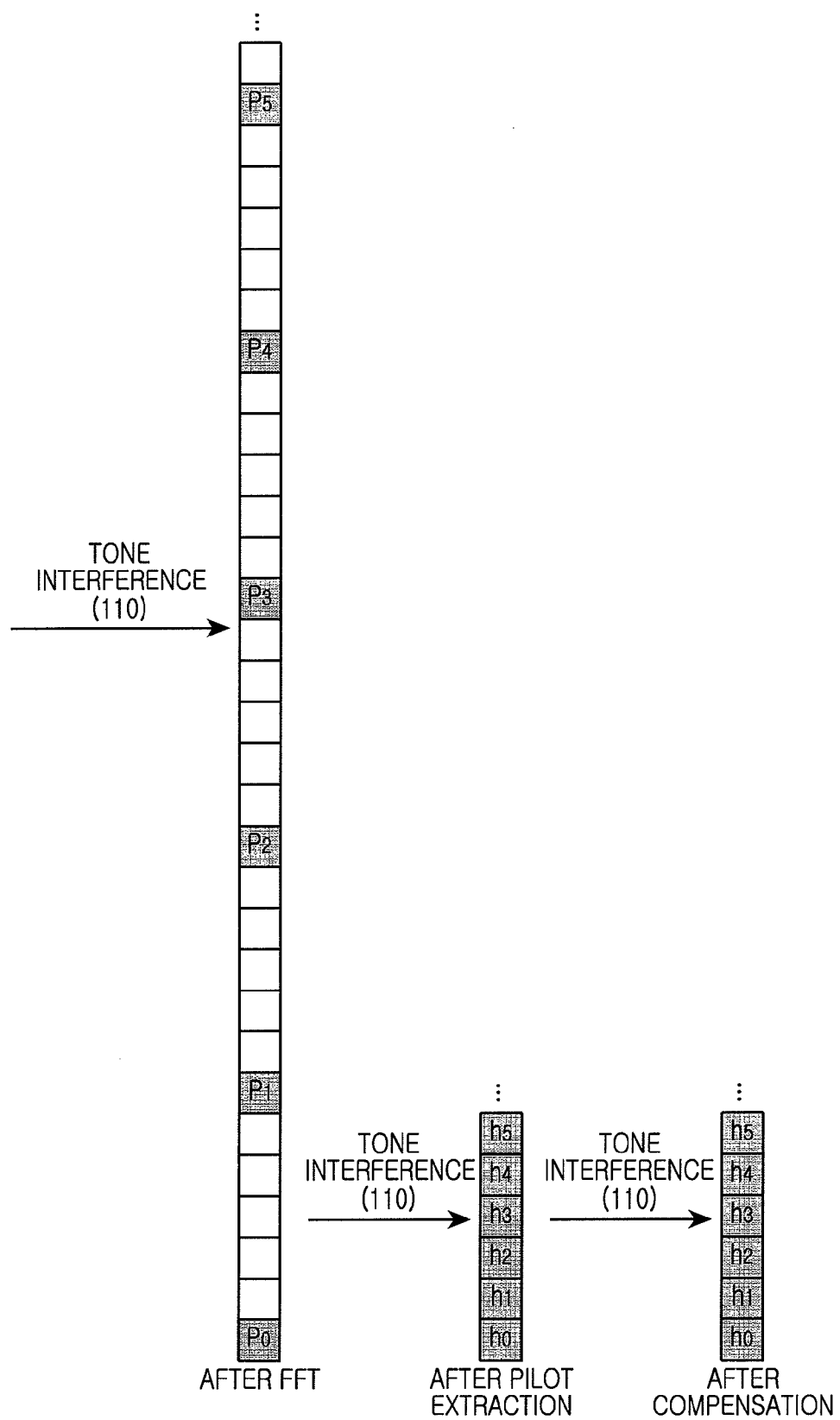
FIG. 1 illustrates a pilot signal commonly used by User Equipments (UEs) and one tone interference in a wireless communication system according to an exemplary embodiment of the present invention.

The following description with reference to the accompanying drawings is provided to assist in a comprehensive understanding of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention described hereinafter relate to a technique for improving reception performance deterioration caused by tone interference in a wireless communication system. For convenience of explanation, terms and names defined in a Long Term Evolution (LTE) standard are used in the present invention. However, the present invention is not limited to these terms and names, and thus the present invention can also apply to a system conforming to other standards.

A pilot signal is classified into a signal that can be commonly used by all User Equipments (UEs) and a signal that can be used by only a specific UE. For example, a pilot signal that can be commonly used can be transmitted together with data that must be received by all UEs. As another example, a pilot signal that can be used by a specific UE can be transmitted together with data that is to be transmitted to the specific UE. In this case, the pilot signal and the data that can be used by the specific UE can be precoded. The signal that can be commonly used (i.e., by all UEs) can be referred to as a cell specific reference signal. The signal that can be used by only the specific UE can be referred to as a UE specific reference signal.

Hereinafter, for convenience of explanation, a position of a subcarrier carrying the pilot signal is referred to as a 'pilot position,' and a position of a subcarrier carrying the data signal is referred to as a 'data position.'

FIG. 1 illustrates a pilot signal commonly used by UEs and one tone interference in a wireless communication system according to an exemplary embodiment of the present invention. That is, FIG. 1 shows a Fast Fourier Transform (FFT) result, a pilot extraction result, and a compensation result when tone interference 110 occurs at the same position as one pilot among cell specific reference signals.

The pilot extraction includes a process of extracting a channel value of the pilot position by compensating for a Transmission (Tx) value by using a Reception (Rx) value of the pilot position during the process of FFT output. The channel value can be estimated by Equation (1) below.

$$h_k = P_k/x_k \quad (1)$$

In Equation (1) above, $h_k$ denotes a channel value of a $k^{th}$ pilot position, $P_k$ denotes an Rx signal of the $k^{th}$ pilot position, and $x_k$ denotes a Tx signal of $k^{th}$ pilot position.

If the pilot signal satisfies a condition of $|x_k|^2=1$, then Equation (1) above can be expressed by Equation (2) below.

$$h_k = P_k \times (x_k)^* \quad (2)$$

In Equation (2) above, $h_k$ denotes a channel value of a $k^{th}$ pilot position, $P_k$ denotes an Rx signal of the $k^{th}$ pilot position, $x_k$ denotes a Tx signal of $k^{th}$ pilot position, and $(x_k)^*$ denotes a complex conjugate of $x_k$.

Referring to FIG. 1, compensation is necessary for a channel value $h_3$ of a position at which the tone interference 110 occurs. The compensation can be performed by using a channel value of a neighboring pilot position. A detailed compensation algorithm can be defined variously according to exemplary embodiments. For example, the compensation can be achieved by interpolation, extrapolation, extension, Minimum Mean Square Error (MMSE), or the like. For example, if the interpolation is used, the channel value $h_3$ can be compensated for by Equation (3) below.

$$h_3 = (h_2 + h_4)/2 \quad (3)$$

In Equation (3) above, $h_k$ denotes a channel value of a $k^{th}$ pilot position.

Figure 2:
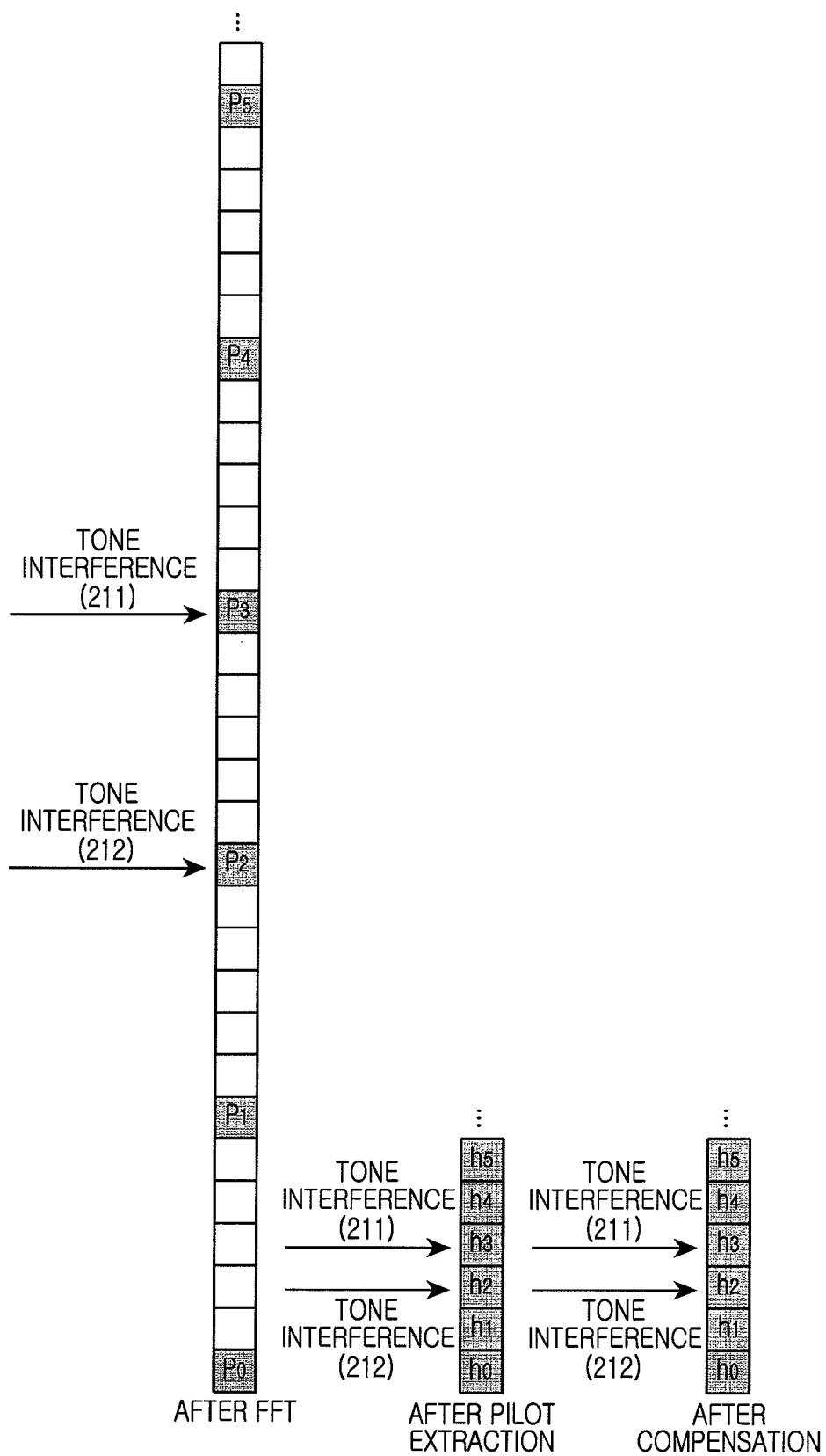
FIG. 2 illustrates a pilot signal commonly used by UEs and two tone interferences in a wireless communication system according to an exemplary embodiment of the present invention.

FIG. 2 illustrates a pilot signal commonly used by all UEs and two tone interferences in a wireless communication system according to an exemplary embodiment of the present invention. That is, FIG. 2 shows an FFT result, a pilot extraction result, and a compensation result when tone interferences 211 and 212 occur at the same positions as two pilots among cell specific reference signals.

Referring to FIG. 2, compensation is necessary for channel values h2 and h3 in positions at which the tone interferences 211 and 211 occur. For example, if the interpolation is used for the compensation, the channel values h2 and h3 can be compensated for by Equation (4) below.

$$h_2 = (h_1 \times 2 + h_4)/3$$

$$h_3 = (h_1 + h_4 \times 2)/3 \quad (4)$$

In Equation (4) above, $h_k$ denotes a channel value of a $k^{th}$ pilot position.

In case of Equation (4) above, a distance on a frequency axis with respect to different channel values is considered. However, an average value can also be used as expressed by Equation (5) below without considering the distance on the frequency axis.

$$h_2 = (h_1 + h_4)/2$$

$$h_3 = (h_1 + h_4)/2 \quad (5)$$

In Equation (5) above, $h_k$ denotes a channel value of a $k^{th}$ pilot position.

For another example, if the MMSE is used for the compensation, the channel value $h_3$ can be compensated for by Equation (6) below.

$$h_3 = w_1 h_2 + w_2 h_4 \quad (6)$$

In Equation (6) above, $h_k$ denotes a channel value of a $k^{th}$ pilot position, and $w_1$ and $w_2$ are defined by Equation (7) below.

$$[w_1 \ w_2] = [c_{23} \ c_{43}] \left( \begin{bmatrix} c_{22} & c_{24} \\ c_{42} & c_{44} \end{bmatrix} + \frac{1}{SNR} \begin{pmatrix} 1 & 0 \\ 1 & 0 \end{pmatrix} \right)^{-1} \quad (7)$$

In Equation (7) above, $c_{ij}$ denotes $E[h_i h_j^*]$, and SNR denotes a signal to noise ratio of a channel.

The compensation described above with reference to FIG. 1 and FIG. 2 uses a channel value of a neighboring pilot position under the assumption that channel continuity is guaranteed on a frequency domain. In case of a UE specific reference signal, precoding is applied in a Resource Block (RB) unit, and thus channel continuity is not guaranteed between different RBs. Therefore, a channel value of a pilot position included in a different RB cannot be used in the compensation. However, there is a case where the same precoding is applied even if the RB is different. In this case, if precoding applied to each RB can be known through higher layer signaling, channel values of different RBs to which the same precoding is applied can be used for the compensation.

Figure 3:
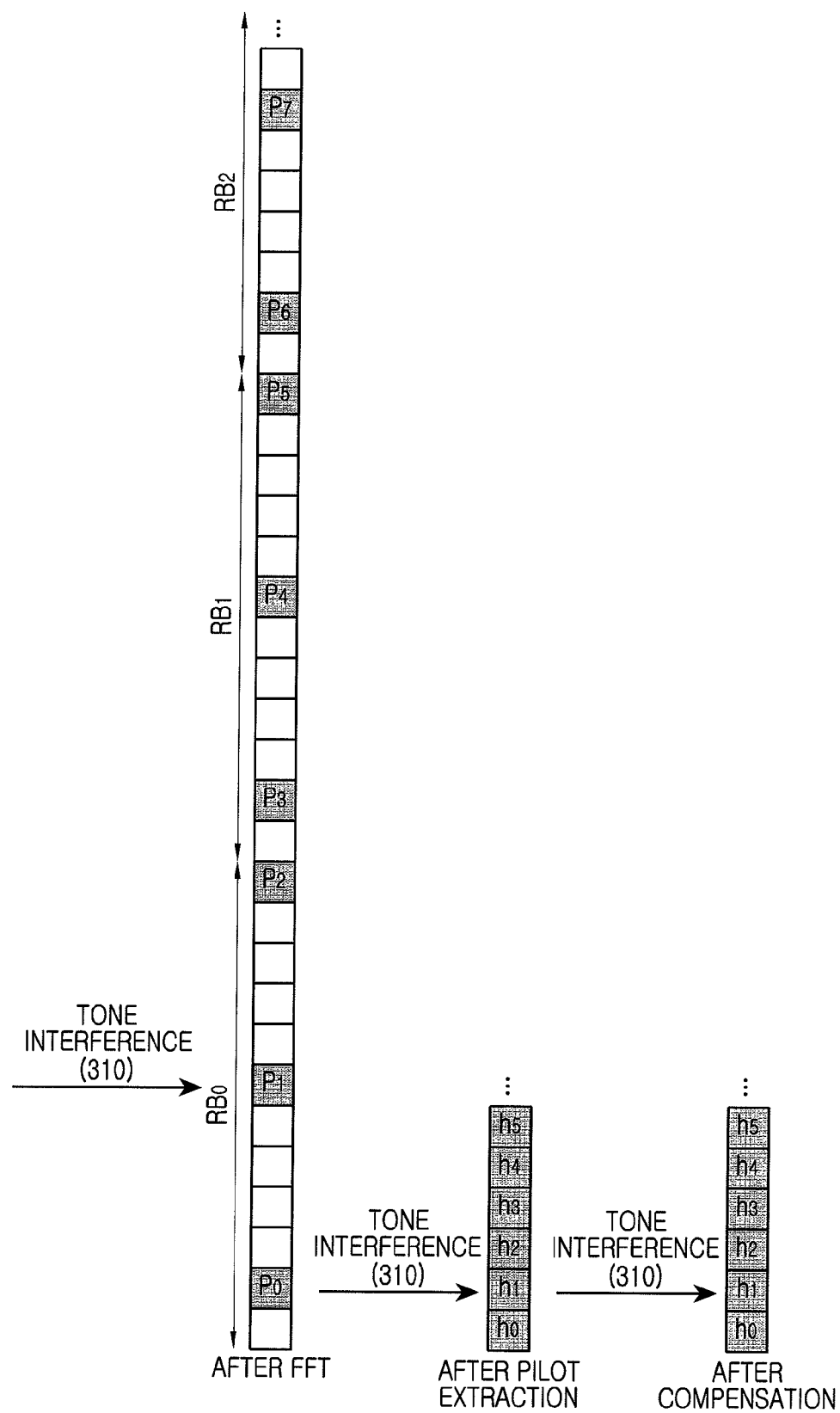
FIG. 3 illustrates a pilot signal used by a specific UE and one tone interference in a wireless communication system according to an exemplary embodiment of the present invention.

FIG. 3 illustrates a pilot signal used by only a specific UE and one tone interference in a wireless communication system according to an exemplary embodiment of the present invention. That is, FIG. 3 shows an FFT result, a pilot extraction result, and a compensation result when tone interference 310 occurs at the same position as one pilot among UE specific reference signals.

Referring to FIG. 3, compensation is necessary for a channel value $h_1$ of a position at which the tone interference 310 occurs. In this case, because the tone interference 310 occurs at an $RB_0$, only channel values $h_0$ and $h_2$ in positions belonging to the $RB_0$ can be used for compensation of the channel value $h_1$. For example, if the interpolation is used for the compensation, the channel value $h_1$ can be compensated for by Equation (8) below.

$$h_1 = (h_0 + h_2)/2 \quad (8)$$

In Equation (8) above, $h_k$ denotes a channel value of a $k^{th}$ pilot position.

Figure 4:
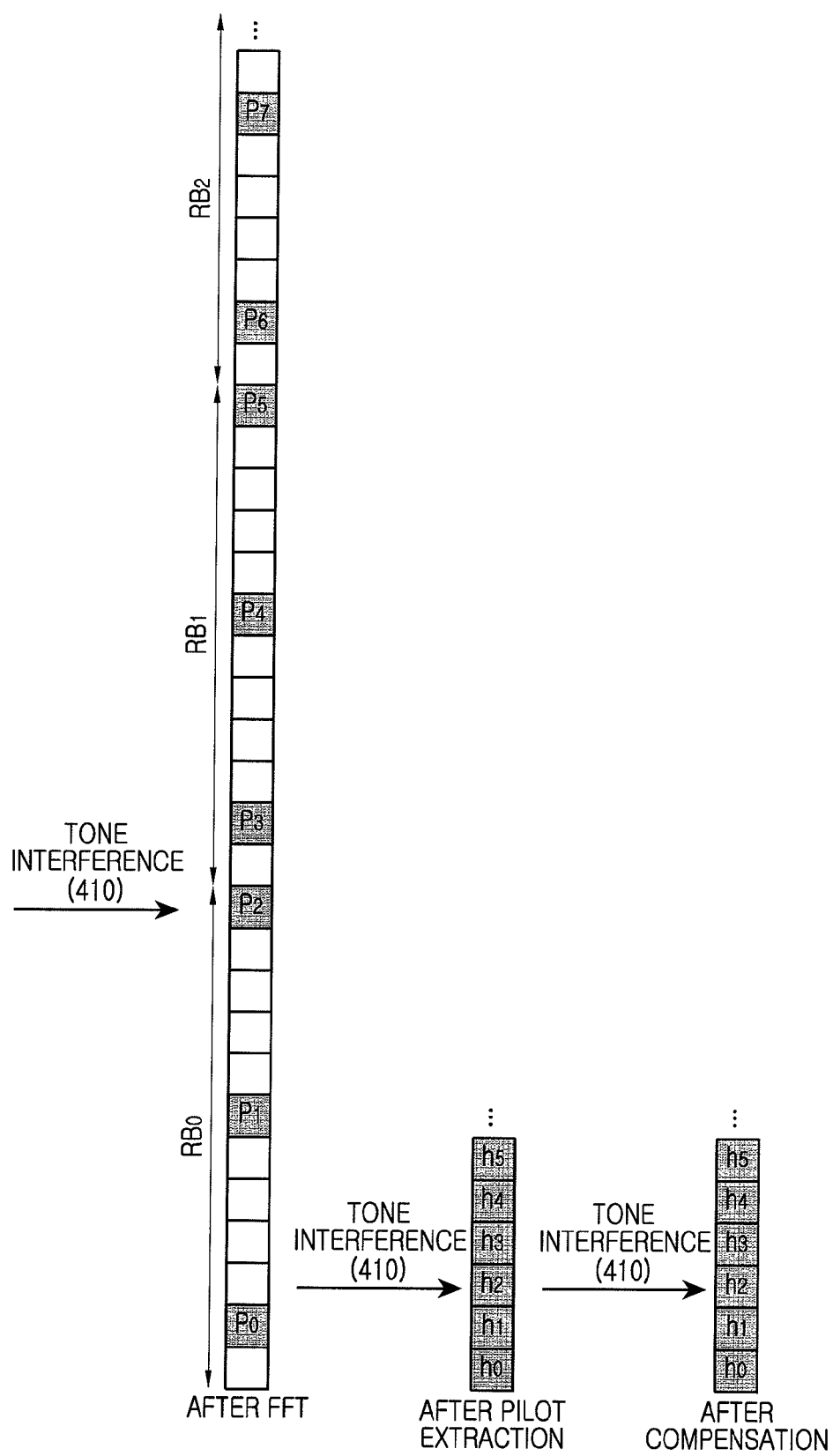
FIG. 4 illustrates a pilot signal used by a specific UE and one tone interference occurring at an outer edge of a Resource Block (RB) in a wireless communication system according to an exemplary embodiment of the present invention.

FIG. 4 illustrates a pilot signal used by only a specific UE and one tone interference occurring at an outer edge of an RB in a wireless communication system according to an exemplary embodiment of the present invention. That is, FIG. 4 shows an FFT result, a pilot extraction result, and a compensation result when tone interference 410 occurs at the same position as one pilot among UE specific reference signals.

Referring to FIG. 4, compensation is necessary for a channel value $h_2$ of a position at which the tone interference 410 occurs. In this case, because the tone interference 410 occurs at an $RB_0$, only channel values $h_0$ and $h_2$ in positions belonging to the $RB_0$ can be used for compensation of the channel value $h_2$. For example, if different precoding is applied to various RBs, then interpolation uses the neighboring pilot signals in a specific RB—and if the pilot signal is located in a specific RB such that the pilot signal does not have two neighboring pilot signals within the specific RB, then interpolation within that specific RB may not be possible. Therefore, the interpolation of Equation (3) above cannot be applied, and thus the extension or the extrapolation is applied. If the extension is used, the channel value $h_2$ can be compensated for by Equation (8) above.

$$h_2 = h_1 \quad (9)$$

In Equation (9) above, $h_k$ denotes a channel value of a $k^{th}$ pilot position.

However, if the same precoding is applied to the $RB_0$ and an $RB_1$, the channel value $h_2$ can be compensated for by the interpolation as expressed by Equation (10) below.

$$h_2 = (h_1 + h_3)/2 \quad (10)$$

In Equation (10) above, $h_k$ denotes a channel value of a $k^{th}$ pilot position.

Figure 5:
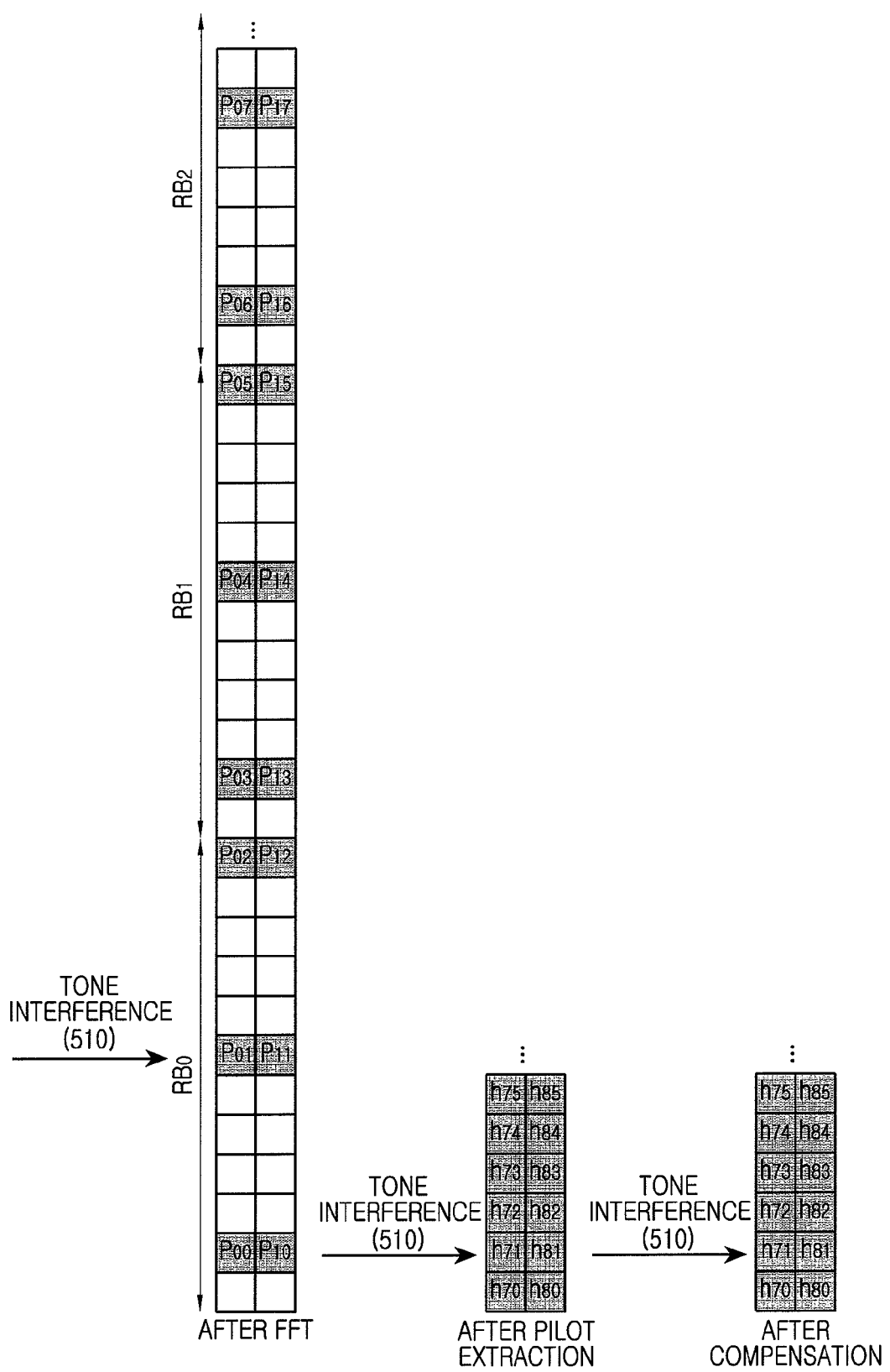
FIG. 5 illustrates a pilot signal used by a specific UE to which Code Division Multiplexing (CDM) is applied and one tone interference in a wireless communication system according to an exemplary embodiment of the present invention.

FIG. 5 illustrates a pilot signal used by only a specific UE to which Code Division Multiplexing (CDM) is applied and one tone interference in a wireless communication system according to an exemplary embodiment of the present invention. That is, FIG. 5 shows an FFT result, a pilot extraction result, and a compensation result when tone interference 510 occurs at the same position as one pilot among UE specific reference signals to which CDM is applied.

In the case of an LTE system, CDM applied between neighboring OFDM symbols is applied to a UE specific reference signal corresponding to antenna ports 7 and 8. In this case, an Rx signal of each pilot position is expressed by Equation (11) below.

$$P_{0k} = (h_{7k} + h_{8k} \times (-1)^m) \times x_{0k}$$

$$P_{1k} = (h_{7k} + h_{8k} \times (-1)^{m+1}) \times x_{1k} \quad (11)$$

In Equation (11) above, $P_{jk}$ denotes an Rx signal at a $k^{th}$ pilot position of a $j^{th}$ symbol, $h_{jk}$ denotes a channel value of a $k^{th}$ pilot position of an antenna port j, and $x_k$ denotes a Tx signal at the $k^{th}$ pilot position of the $j^{th}$ symbol. Herein, m is set to an even or odd value according to the pilot position.

In case of applying the CDM, if the pilot signal satisfies a condition of $|x_k|^2 = 1$, then the channel value of the pilot position is estimated by Equation (12) below.

$$P_{7k} = (P_{0k} \times (x_{0k})^* + P_{1k} \times (x_{1k})^*)/2$$

$$P_{8k} = (-1)^m \times (P_{0k} \times (x_{0k})^* - P_{1k} \times (x_{1k})^*)/2 \quad (12)$$

In Equation (12) above, $P_{jk}$ denotes an Rx signal at a $k^{th}$ pilot position of a $j^{th}$ symbol, $h_{jk}$ denotes a channel value of a $k^{th}$ pilot position of an antenna port j, $x_k$ denotes a Tx signal at the $k^{th}$ pilot position of the $j^{th}$ symbol, and $(x_{jk})^*$ denotes a complex conjugate of $x_{jk}$. Herein, m is set to an even or odd value according to the pilot position.

Referring to FIG. 5, compensation is necessary for channel values $h_{71}$ and $h_{81}$ of a position at which the tone interference 510 occurs. In this case, because tone interference 510 occurs at an $RB_0$, only channel values in positions belonging to the $RB_0$ can be used for compensation of the channel values $h_{71}$ and $h_{81}$. For example, if the interpolation is used for the compensation, the channel values $h_{71}$ and $h_{81}$ can be compensated for by Equation (13) below.

$$h_{71} = (h_{70} + h_{72})/2$$

$$h_{81} = (h_{80} + h_{82})/2 \quad (13)$$

In Equation (13) above, $h_{jk}$ denotes a channel value of a $k^{th}$ pilot position of an antenna port j.

Figure 6:
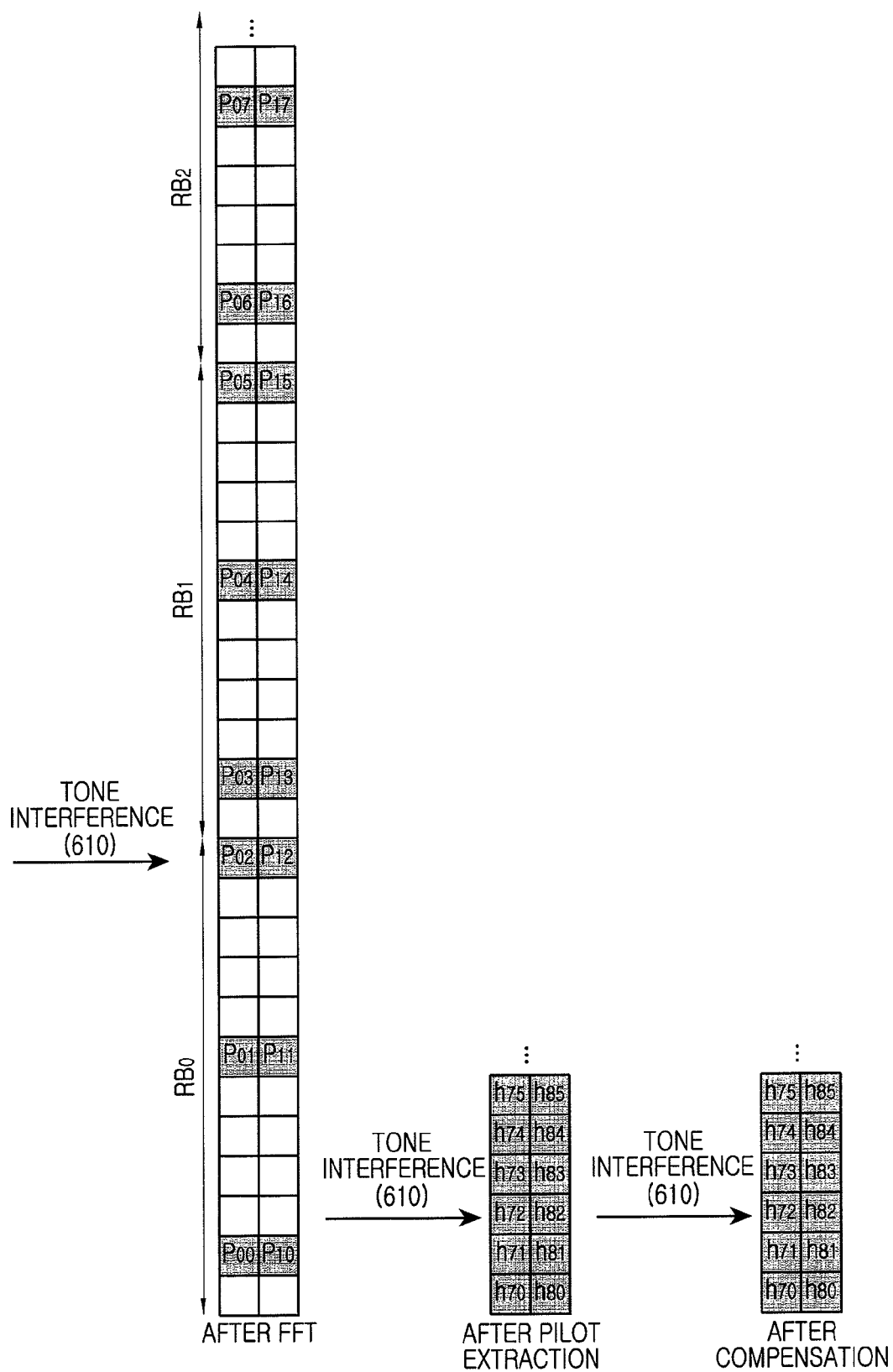
FIG. 6 illustrates a pilot signal used by a specific UE to which CDM is applied and one tone interference occurring at an outer edge of an RB in a wireless communication system according to an exemplary embodiment of the present invention.

FIG. 6 illustrates a pilot signal used by only a specific UE to which CDM is applied and one tone interference occurring at an outer edge of an RB in a wireless communication system according to an exemplary embodiment of the present invention. That is, FIG. 6 shows an FFT result, a pilot extraction result, and a compensation result when tone interference 610 occurs at the same position as one pilot among UE specific reference signals to which CDM is applied.

Referring to FIG. 6, compensation is necessary for channel values h72 and h82 of a position at which the tone interference 610 occurs. In this case, because the tone interference 610 occurs at an $RB_0$, only channel values in positions belonging to the $RB_0$ can be used for compensation of the channel values $h_{72}$ and $h_{82}$. Therefore, the interpolation of Equation (13) above cannot be applied, and thus the extension or the extrapolation is applied. For example, if the extension is used for the compensation, the channel values $h_{72}$ and $h_{82}$ can be compensated for by Equation (14) below.

$$h_{72} = h_{71}$$

$$h_{82} = h_{81} \quad (14)$$

In Equation (14) above, $h_{jk}$ denotes a channel value of a $k^{th}$ pilot position of an antenna port j.

However, if the same precoding is applied to the $RB_0$ and an $RB_1$, the channel values $h_{72}$ and $h_{82}$ can be compensated for by the interpolation as expressed by Equation (15) below.

$$h_{72} = (h_{71} + h_{73})/2$$

$$h_{82} = (h_{81} + h_{83})/2 \quad (15)$$

In Equation (15) above, $h_{jk}$ denotes a channel value of a $k^{th}$ pilot position of an antenna port j.

Hereinafter, a structure and operation of a receiving end that compensates for a channel value of a pilot position described above will be described in greater detail with reference to the accompanying drawings.

Figure 7:
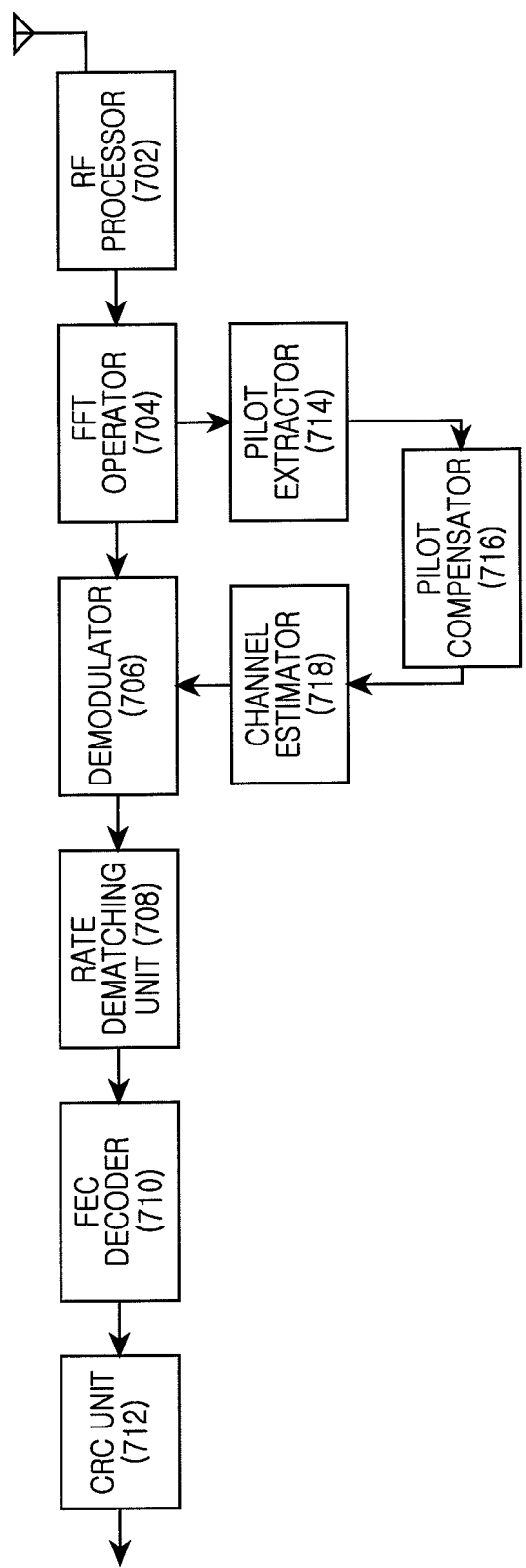
FIG. 7 is a block diagram of a receiving end in a wireless communication system according to an exemplary embodiment of the present invention.

FIG. 7 is a block diagram of a receiving end in a wireless communication system according to an exemplary embodiment of the present invention.

Referring to FIG. 7, the receiving end includes a Radio Frequency (RF) processor 702, an FFT operator 704, a demodulator 706, a rate dematching unit 708, an FEC decoder 710, a CRC unit 712, a pilot extractor 714, a pilot compensator 716, and a channel estimator 718.

The RF processor 702 performs a function of receiving a signal through a radio channel, such as a function of signal band conversion, amplification, or the like. That is, the RF processor 702 down-converts an RF signal received through an antenna into a baseband signal. For example, the RF processor 702 can include an amplifier, a mixer, an oscillator, an Analog to Digital Converter (ADC), etc. The FFT operator 704 divides the signal provided from the RF processor 702 on an OFDM symbol basis, and converts a time-axis signal into a frequency-axis signal by performing an FFT operation on an OFDM symbol.

The demodulator 706 generates Log Likelihood Ratio (LLR) values for a signal of the data position provided from the FFT operator 704 by using a channel value of the data position provided from the channel estimator 718. The rate dematching unit 708 performs dematching on the LLR values as opposed to the rate matching performed in a transmitting end. That is, the rate dematching unit 708 generates the LLR values in accordance with a coding rate by inserting zero to a punctured position or by compressing repeated values. The FEC decoder 710 restores information bits by using the LLR values. In other words, the FEC decoder 710 performs channel decoding and error correction on the LLR values. For example, convolutional codes, turbo codes, or Low Density Parity Codes (LDPC) can be used. The CRC unit 712 determines a presence or absence of an error in the decoded information bits. In addition, the CRC unit 712 can determine whether there is a request for retransmission according to the presence or absence of the error.

The pilot extractor 714 extracts a signal of a pilot position among frequency-axis signals generated by the FFT operator 704, and generates channel values of the pilot position by using a Tx value of the pilot signal. The pilot signal can be transformed according to a predetermined rule. In the case of an LTE system, the pilot signal can be transformed by a gold sequence of which an initial state changes depending on a cell IDentifier (ID), a Cyclic Prefix (CP) type, a slot number, and a frame number. In addition, a method of deploying the pilot position can vary depending on the cell ID and the number of Tx antennas. For example, to generate the channel values, the pilot extractor 714 can perform multiplication on the Rx signal of the pilot position and a complex conjugate of a predetermined pilot signal value. If CDM is applied between neighboring OFDM symbols, the pilot extractor 714 generates the channel values of the pilot position by using signals of the pilot position of neighboring OFDM symbols. For example, to generate the channel values, the pilot extractor 714 calculates the product of the Rx signal of the pilot signal and the complex conjugate of the predetermined pilot signal from a first symbol, and calculates the product of the Rx signal of the pilot position and the complex conjugate of the predetermined pilot signal from a second symbol. Further, the pilot extractor 714 can add the two multiplication results and then divide it by two, or can subtract the two multiplication results and then divide it by two or multiply it by −1.

The pilot compensator 716 compensates for a channel value of a position at which tone interference occurs among the channel values of the pilot position generated by the pilot extractor 714. If precoding is performed in the transmitting end, the pilot compensator 716 compensates for the channel value which experiences the tone interference by using at least one channel value which does not experience the tone interference within a range of the same precoding as the position at which the tone interference occurs. The tone interference occurs according to a hardware feature of the receiving end, and thus occurs at the same position always. Therefore, the tone interference can be predetermined through preliminary experiment, and the pilot compensator 716 stores a predetermined position at which the tone interference occurs. Accordingly, the pilot compensator 716 determines a channel value to be compensated for on the basis of the predetermined position at which the tone interference occurs, and compensates for a determined channel value. The pilot compensator 716 compensates for the channel value by using at least one channel value which does not experience the tone interference. For example, for the compensation, interpolation, extension, extrapolation, MMSE, etc., can be used. The pilot compensator 716 provides the channel estimator 718 with channel values of all pilot positions including the compensated channel value.

The channel estimator 718 receives the channel values of all pilot positions including the compensated channel value from the pilot compensator 716, and estimates channel values of a data position. In this case, the channel estimator 718 can more correctly estimate the channel values of the pilot position by using the channel values of the pilot position provided from the pilot compensator 716, and can estimate the channel values of the data position. For example, for more accurate channel estimation, the channel estimator 718 can use a method based on Channel Impulse Response (CIR) estimation on a time axis on the basis of MMSE and Inverse Discrete Fourier Transform (IDFT). In this case, estimation of the channel value of the pilot position and estimation of the channel value of the data position can be performed not as separate processes but as one process. Further, the channel estimator 718 provides the demodulator 706 with the channel values of the data position.

Figure 8:
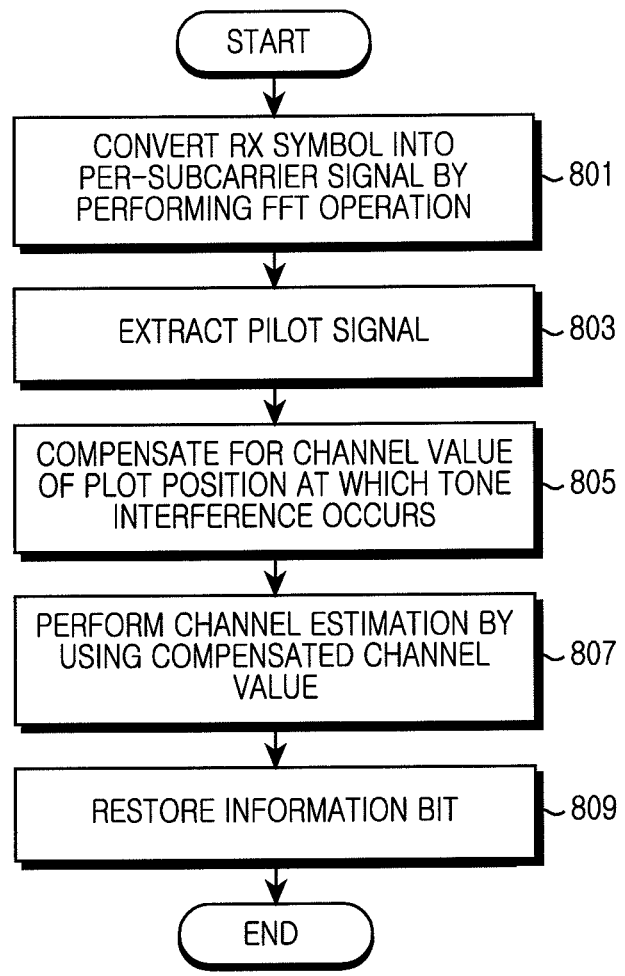
FIG. 8 is a flowchart illustrating an operation of a receiving end in a wireless communication system according to an exemplary embodiment of the present invention.

FIG. 8 is a flowchart illustrating an operation of a receiving end in a wireless communication system according to an exemplary embodiment of the present invention.

Referring to FIG. 8, the receiving end converts an Rx signal into a per-subcarrier signal by performing an FFT operation in step 801. More specifically, the receiving end down-converts an RF signal received through an antenna into a baseband signal, divides the baseband signal on an OFDM symbol basis, and converts a time-axis signal into a frequency-axis signal by performing the FFT operation on the OFDM symbol.

In step 803, the receiving end extracts pilot signals (i.e., signals of a pilot position) among the frequency-axis signals, and generates channel values of the pilot position by using a Tx value of the pilot signal. The pilot position is predetermined between a transmitting end and the receiving end. However, a method of deploying a position of the pilot signal can vary depending on a cell ID and the number of Tx antennas. For example, to generate the channel values, the receiving end can perform multiplication on the Rx signal of the pilot position and a complex conjugate of a predetermined pilot signal value. If CDM is applied between neighboring OFDM symbols, the receiving end generates the channel values of the pilot position by using signals of the pilot position of neighboring OFDM symbols. For example, to generate the channel values, the receiving end calculates the product of the Rx signal of the pilot signal and the complex conjugate of the predetermined pilot signal from a first symbol, and calculates the product of the Rx signal of the pilot position and the complex conjugate of the predetermined pilot signal from a second symbol. Further, the receiving end can add the two multiplication results and then divide it by two, or can subtract the two multiplication results and then divide it by two or multiply it by −1.

In step 805, the receiving end compensates for a channel value of a position at which tone interference occurs. In other words, the receiving end compensates for at least one channel value of a position at which the tone interference occurs among the channel values of the pilot position. If precoding is performed in the transmitting end, the receiving end compensates for the channel value which experiences the tone interference by using at least one channel value which does not experience the tone interference within a range of the same precoding as the position at which the tone interference occurs. The receiving end stores a predetermined position at which the tone interference occurs. Therefore, the receiving end compensates for a channel value of the predetermined position. More specifically, the receiving end compensates for the channel value by using at least one channel value which does not experience tone interference. For example, for the compensation, interpolation, extension, extrapolation, MMSE, etc., can be used.

After compensating for the at least one channel value, proceeding to step 807, the receiving end estimates channel values of a data position by using the channel values of all pilot positions including the compensated channel. In this case, the receiving end can more correctly estimate the channel values of the pilot position, and can estimate the channel values of the data position. For example, for more accurate channel estimation, the receiving end can use a method based on CIR estimation on a time axis on the basis of MMSE and IDFT. In this case, estimation of the channel value of the pilot position and estimation of the channel value of the data position can be performed not as separate processes but as one process.

After estimating the channel values of the data position, proceeding to step 809, the receiving end restores information bits. More specifically, the receiving end generates LLR values for a signal of the data position by using the channel values of the data position, performs rate dematching, and then restores the information bits by using the LLR values. In addition, the receiving end can determine whether there is an error in the information bits by using CRC.

Figure 9:
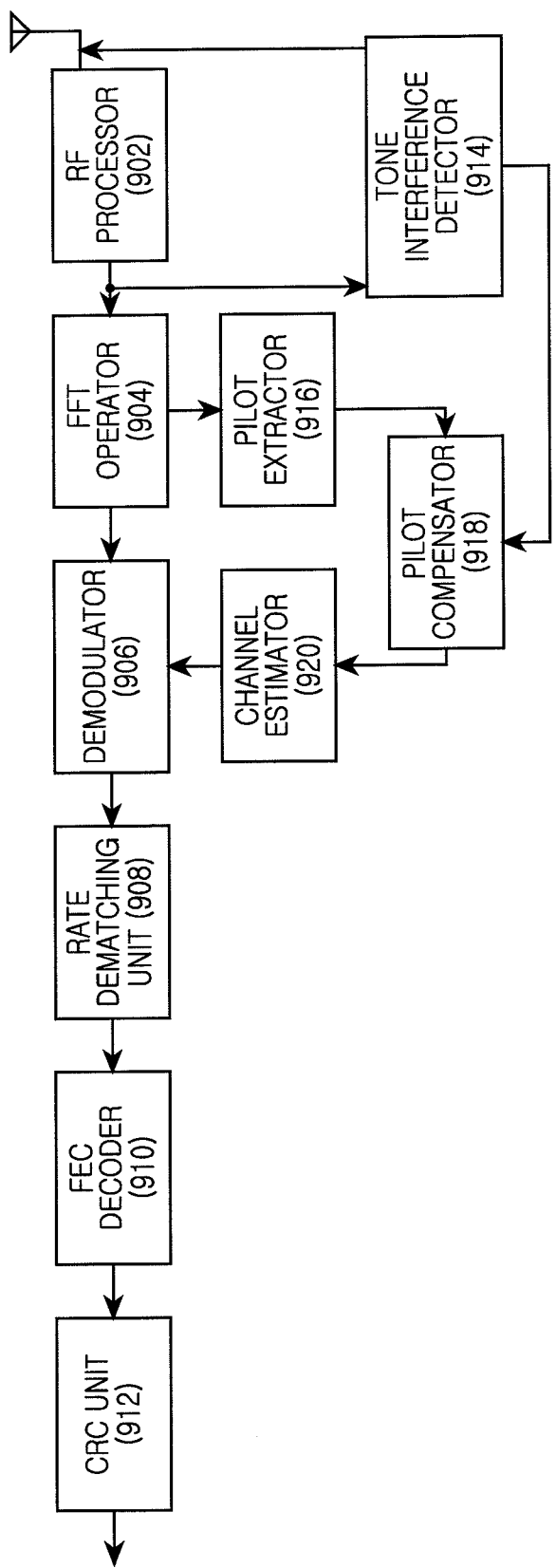
FIG. 9 is a block diagram of a receiving end in a wireless communication system according to an exemplary embodiment of the present invention.

FIG. 9 is a block diagram of a receiving end in a wireless communication system according to an exemplary embodiment of the present invention.

Referring to FIG. 9, the receiving end includes an RF processor 902, an FFT operator 904, a demodulator 906, a rate dematching unit 908, an FEC decoder 910, a CRC unit 912, a tone interference detector 914, a pilot extractor 916, a pilot compensator 918, and a channel estimator 920.

The RF processor 902 performs a function of receiving a signal through a radio channel, such as a function of signal band conversion, amplification, or the like. That is, the RF processor 902 down-converts an RF signal received through an antenna into a baseband signal. For example, the RF processor 902 can include an amplifier, a mixer, an oscillator, an ADC, etc. The FFT operator 904 divides the signal provided from the RF processor 902 on an OFDM symbol basis, and converts a time-axis signal into a frequency-axis signal by performing an FFT operation on an OFDM symbol.

The demodulator 906 generates LLR values for a signal of the data position provided from the FFT operator 904 by using a channel value of the data position provided from the channel estimator 920. The rate dematching unit 908 performs dematching on the LLR values as opposed to the rate matching performed in a transmitting end. That is, the rate dematching unit 908 generates the LLR values in accordance with a coding rate by inserting zero to a punctured position or by compressing repeated values. The FEC decoder 910 restores information bits by using the LLR values. In other words, the FEC decoder 910 performs channel decoding and error correction on the LLR values. For example, convolutional codes, turbo codes, or LDPC can be used. The CRC unit 912 determines a presence or absence of an error in the decoded information bits. In addition, the CRC unit 912 can determine whether there is a request for retransmission according to the presence or absence of the error.

The tone interference detector 914 detects a position of a subcarrier at which tone interference occurs. The position at which the tone interference occurs can be determined in various manners according to a detailed embodiment. For example, the position at which the tone interference occurs can be detected in such a manner that a reference signal is allowed to pass an Rx path and then spectrum analysis is performed on the reference signal that has passed the Rx path. In this case, the tone interference detector 914 inputs the reference signal to a previous portion of the RF processor 902, extracts the reference signal from a previous portion of the FFT operator 904, and then performs the spectrum analysis on the reference signal. Further, the tone interference detector 914 determines a position at which the tone interference occurs from the spectrum analysis result, and if the position of the tone interference coincides with at least one pilot position, notifies the position of the tone interference to the pilot compensator 918. The tone interference position detection can be performed based on a specific period.

The pilot extractor 916 extracts a signal of a pilot position among frequency-axis signals generated by the FFT operator 904, and generates channel values of the pilot position by using a Tx value of the pilot signal. The pilot signal can be transformed according to a predetermined rule. In case of an LTE system, the pilot signal can be transformed by a gold sequence of which an initial state changes depending on a cell ID, a CP type, a slot number, and a frame number. In addition, a method of deploying the pilot position can vary depending on the cell ID and the number of Tx antennas. For example, to generate the channel values, the pilot extractor 916 can perform multiplication on the Rx signal of the pilot position and a complex conjugate of a predetermined pilot signal value. If CDM is applied between neighboring OFDM symbols, the pilot extractor 916 generates the channel values of the pilot position by using signals of the pilot position of neighboring OFDM symbols. For example, to generate the channel values, the pilot extractor 916 calculates the product of the Rx signal of the pilot signal and the complex conjugate of the predetermined pilot signal from a first symbol, and calculates the product of the Rx signal of the pilot position and the complex conjugate of the predetermined pilot signal from a second symbol. Further, the pilot extractor 916 can add the two multiplication results and then divide it by two, or can subtract the two multiplication results and then divide it by two or multiply it by −1.

The pilot compensator 918 compensates for a channel value of the pilot position notified by the tone interference detector 914 among the channel values of the pilot position generated by the pilot extractor 916. The pilot compensator 918 compensates for the channel value by using at least one channel value which does not experience tone interference. If precoding is performed in the transmitting end, the pilot compensator 918 compensates for the channel value which experiences the tone interference by using at least one channel value which does not experience the tone interference within a range of the same precoding as the position at which the tone interference occurs. For example, for the compensation, interpolation, extension, extrapolation, MMSE, etc., can be used. The pilot compensator 918 provides the channel estimator 920 with channel values of all pilot positions including the compensated channel value.

The channel estimator 920 receives the channel values of all pilot positions including the compensated channel value from the pilot compensator 918, and estimates channel values of a data position. In this case, the channel estimator 920 can more correctly estimate the channel values of the pilot position by using the channel values of the pilot position provided from the pilot compensator 918, and can estimate the channel values of the data position. For example, for more accurate channel estimation, the channel estimator 920 can use a method based on CIR estimation on a time axis on the basis of MMSE and IDFT. In this case, estimation of the channel value of the pilot position and estimation of the channel value of the data position can be performed not as separate processes but as one process. Further, the channel estimator 920 provides the demodulator 906 with the channel values of the data position.

Figure 10:
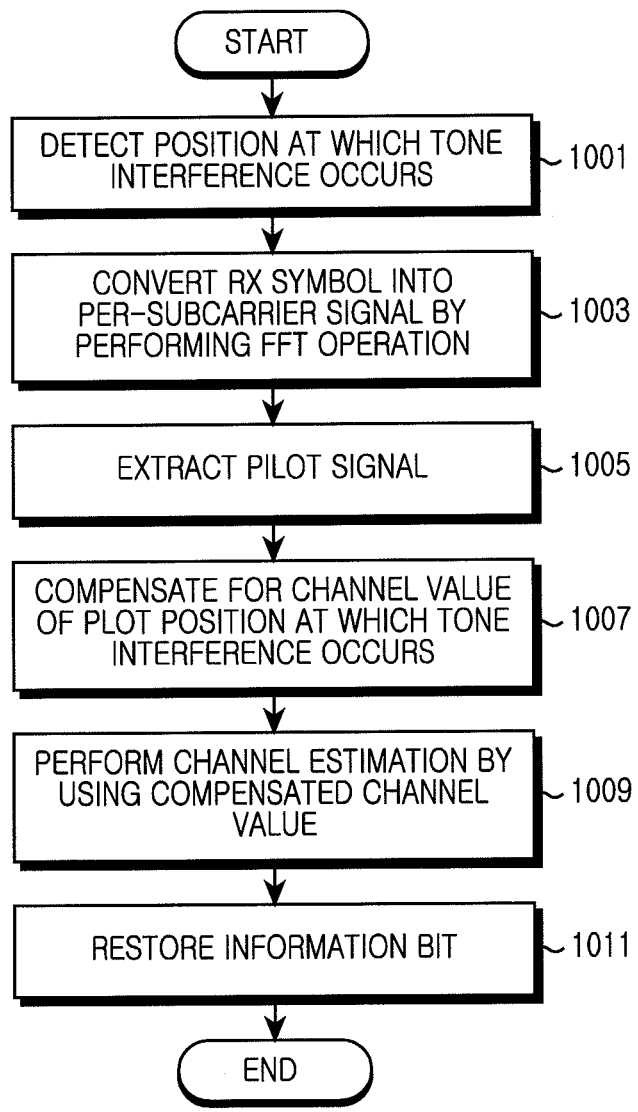
FIG. 10 is a flowchart illustrating an operation of a receiving end in a wireless communication system according to an exemplary embodiment of the present invention.

FIG. 10 is a flowchart illustrating an operation of a receiving end in a wireless communication system according to an exemplary embodiment of the present invention.

Referring to FIG. 10, the receiving end detects a position of a subcarrier at which tone interference occurs in step 1001. The position at which the tone interference occurs can be determined in various manners according to a detailed embodiment. For example, the position at which the tone interference occurs can be detected in such a manner that a reference signal is allowed to pass an Rx path and then spectrum analysis is performed on the reference signal that has passed the Rx path. In this case, the receiving end inputs the reference signal to a previous portion of the RF front end, extracts the reference signal from a previous portion of an element at which the FFT operation is performed, and then performs the spectrum analysis on the reference signal. Further, the receiving end determines a position at which the tone interference occurs from the spectrum analysis result. The tone interference position detection of step 1001 can be performed based on a specific period.

In step 1003, the receiving end converts an Rx signal into a per-subcarrier signal by performing an FFT operation. More specifically, the receiving end down-converts an RF signal received through an antenna into a baseband signal, divides the baseband signal on an OFDM symbol basis, and converts a time-axis signal into a frequency-axis signal by performing the FFT operation on the OFDM symbol.

In step 1005, the receiving end extracts pilot signals (i.e., signals of a pilot position) among the frequency-axis signals, and generates channel values of the pilot position by using a Tx value of the pilot signal. The pilot position is predetermined between a transmitting end and the receiving end. However, a method of deploying a position of the pilot signal can vary depending on a cell ID and the number of Tx antennas. For example, to generate the channel values, the receiving end can perform multiplication on the Rx signal of the pilot position and a complex conjugate of a predetermined pilot signal value. If CDM is applied between neighboring OFDM symbols, the receiving end generates the channel values of the pilot position by using signals of the pilot position of neighboring OFDM symbols. For example, to generate the channel values, the receiving end calculates the product of the Rx signal of the pilot signal and the complex conjugate of the predetermined pilot signal from a first symbol, and calculates the product of the Rx signal of the pilot position and the complex conjugate of the predetermined pilot signal from a second symbol. Further, the receiving end can add the two multiplication results and then divide it by two, or can subtract the two multiplication results and then divide it by two or multiply it by −1.

In step 1007, the receiving end compensates for a channel value of a position at which tone interference occurs. In other words, the receiving end compensates for at least one channel value of a position at which the tone interference occurs among the channel values of the pilot position. If precoding is performed in the transmitting end, the receiving end compensates for the channel value which experiences the tone interference by using at least one channel value which does not experience the tone interference within a range of the same precoding as the position at which the tone interference occurs. The receiving end determines a position at which the tone interference occurs according to the detection result of step 1001. More specifically, the receiving end compensates for the channel value by using at least one channel value which does not experience the tone interference. For example, for the compensation, interpolation, extension, extrapolation, MMSE, etc., can be used.

After compensating for the at least one channel value, proceeding to step 1009, the receiving end estimates channel values of a data position by using the channel values of all pilot positions including the compensated channel. In this case, the receiving end can more correctly estimate the channel values of the pilot position, and can estimate the channel values of the data position. For example, for more accurate channel estimation, the receiving end can use a method based on CIR estimation on a time axis on the basis of MMSE and IDFT. In this case, estimation of the channel value of the pilot position and estimation of the channel value of the data position can be performed not as separate processes but as one process.

After estimating the channel values of the data position, proceeding to step 1011, the receiving end restores information bits. More specifically, the receiving end generates LLR values for a signal of the data position by using the channel values of the data position, performs rate dematching, and then restores the information bits by using the LLR values. In addition, the receiving end can determine whether there is an error in the information bits by using CRC.

Figure 11:
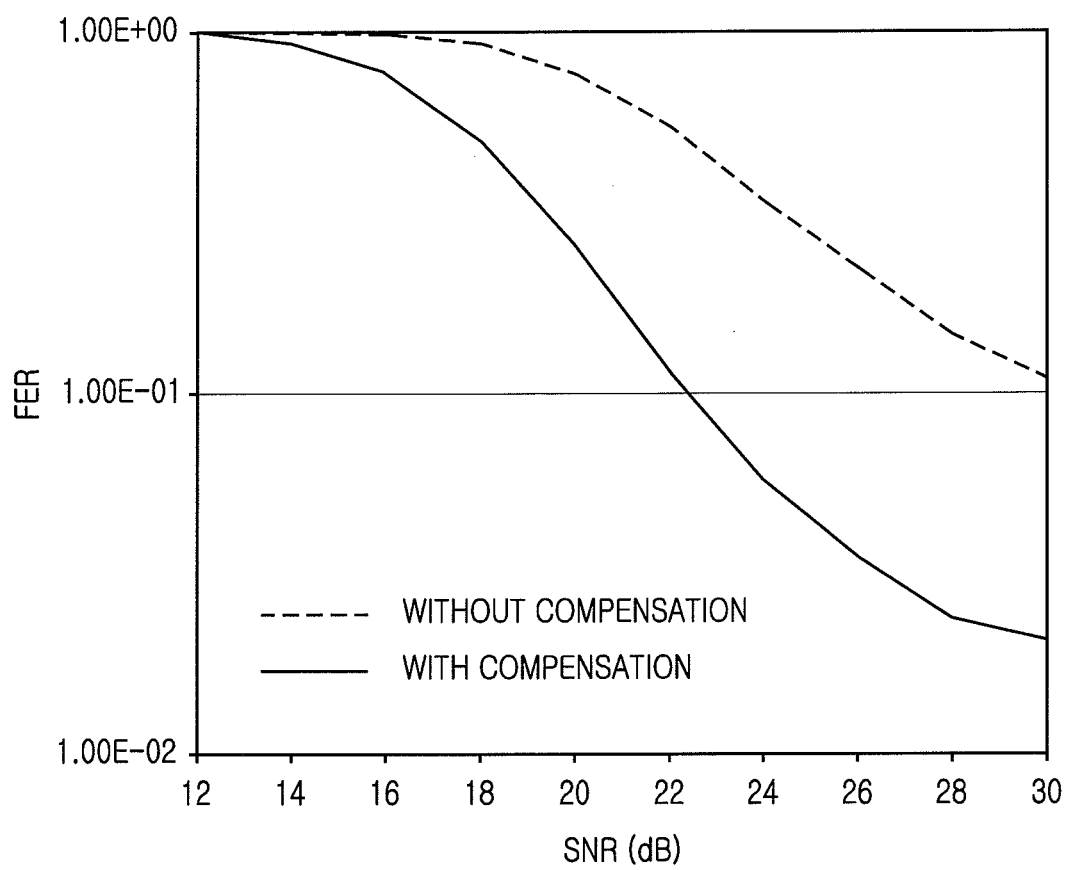
FIG. 11 is a graph illustrating performance of a wireless communication system according to an exemplary embodiment of the present invention.

FIG. 11 is a graph illustrating performance of a wireless communication system according to an exemplary embodiment of the present invention. In the graph of FIG. 11, a simulation result of a system to which pilot compensation is applied according to an exemplary embodiment of the present invention in comparison with a conventional system. The simulation is performed under the assumption that an LTE system is used in an environment where a 3RB Physical Downlink Shared Channel (PDSCH) is applied to a 5 MHz bandwidth and a Modulation and Coding Scheme (MCS) 26 is applied. In the graph, a horizontal axis represents a signal to noise ratio, and a vertical axis represents a Frame Error Rate (FER). Referring to FIG. 11, it can be seen that an error rate significantly decreases when the pilot compensation is performed according to an exemplary embodiment of the present invention in comparison with a case where there is no pilot compensation.

According to exemplary embodiments of the present invention, if tone interference occurs at a position carrying a pilot signal in a wireless communication system, distortion caused by the tone interference is compensated for, thereby improving channel estimation performance and data reception performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for a receiving end in a wireless communication system, the apparatus comprising:
   a receiver configured to receive signals including at least one reference signal for estimating a channel;
   a compensator configured to compensate for a reference signal which is distorted, from among the at least one reference signal, by using at least one other signal; and
   a decoder configured to decode signals based on the reference signal compensated by the compensator,
   wherein the reference signal is compensated to eliminate a distortion by a tone interference and is located at a predetermined subcarrier at which the tone interference occurs, and
   wherein the tone interference occurs at at least one constant position in a physical resource.

2. The apparatus of claim 1, wherein the compensator compensates for the reference signal by using one of interpolation, extrapolation, extension, and Minimum Mean Square Error (MMSE).

3. The apparatus of claim 1, wherein the reference signal and the at least one other signal are located in at least one resource region where a same precoding is applied.

4. The apparatus of claim 3, wherein the at least one other channel estimation value comprises at least one channel estimation value which does not experience the tone interference.

5. The apparatus of claim 1, further comprising:
a detector configured to detect a position where the reference signal distorted due to the interference is received.

6. The apparatus of claim 5, wherein the detector detects the position at which a tone interference occurs by using a spectrum analysis result of a signal that has passed a reception path.

7. The apparatus of claim 1, further comprising:
an estimator configured to estimate channel estimation values in positions carrying data by using channel estimation values in positions carrying reference signals including the compensated channel estimation value; and
a demodulator configured to demodulate data signals by using the channel estimation values of the positions carrying the data.

8. The apparatus of claim 7, wherein the estimator estimates channel estimation values based on Channel Impulse Response (CIR) estimation on a time axis on the basis of MMSE and Inverse Discrete Fourier Transform (IDFT).

9. The apparatus of claim 1, further comprising:
an extractor configured to generate a plurality of channel estimation values in positions carrying reference signals among the frequency-axis signals.

10. The apparatus of claim 1, wherein the compensator compensates a distorted channel estimation value from the reference signal.

11. The apparatus of claim 1,
wherein the reference signal is received in a tone under the tone interference, and
wherein the at least one other signal is received in at least one tone located at a position different than the tone under the tone interference.

12. The apparatus of claim 1, wherein the reference signal comprises a pilot signal.

13. The apparatus of claim 1, wherein the reference signal is distorted by a narrow-band interference having an effect in a subcarrier unit.

14. A method for an operation of a receiving end in a wireless communication system, the method comprising:
receiving signals including at least one reference signal for estimating a channel;
compensating for a reference signal, which is distorted from among the at least one reference signal, by using at least one other signal; and
decoding signals based on the reference signal compensated by the compensator,
wherein the reference signal is compensated to eliminate a distortion by a tone interference and is located at a predetermined subcarrier at which the tone interference occurs, and
wherein the tone interference occurs at at least one constant position in a physical resource.

15. The method of claim 14, wherein the compensating for the reference signal comprises, compensating for the reference signal by using one of interpolation, extrapolation, extension, and Minimum Mean Square Error (MMSE).

16. The method of claim 14, wherein the reference signal and the at least one other signal are located in at least one resource region where a same precoding is applied.

17. The method of claim 16, wherein the at least one other channel estimation value comprises at least one channel estimation value which does not experience the tone interference.

18. The method of claim 14, further comprising:
detecting a position where the reference signal distorted due to the interference is received.

19. The method of claim 18, wherein the detecting of the position comprises, detecting the position at which a tone interference occurs by using a spectrum analysis result of a signal that has passed a reception path.

20. The method of claim 14, further comprising:
estimating channel estimation values in positions carrying data by using channel estimation values in positions carrying the reference signals including the compensated channel estimation value; and
demodulating data signals by using the channel estimation values of the positions carrying the data.

21. The method of claim 20, wherein the estimating of channel estimation values in positions carrying data comprises,
estimating channel estimation values based on Channel Impulse Response (CIR) estimation on a time axis on the basis of MMSE and Inverse Discrete Fourier Transform (IDFT).

22. The method of claim 14, further comprising:
generating a plurality of channel estimation values in positions carrying reference signals among the frequency-axis signals.

23. The method of claim 14, wherein the compensating for the distortion of the reference signal comprises:
compensating a distorted channel estimation value from the reference signal.

24. The method of claim 14,
wherein the reference signal is received in a tone under the tone interference, and
wherein the at least one other signal is received in at least one tone located at a position different than the tone under the tone interference.

25. The method of claim 14, wherein the reference signal comprises a pilot signal.

26. The method of claim 14, wherein the reference signal is distorted by a narrow-band interference having an effect in a subcarrier unit.

27. A method for an operation of a receiving end in a wireless communication system, the method comprising:
generating channel values in positions carrying reference signals among signals comprising reference signals and information signals; and
compensating for a tone interference which occurs in a first position, where a first reference signal is distorted by an interference, by compensating a channel value from the first reference signal,
wherein the reference signal is compensated to eliminate a distortion by a tone interference and is located at a predetermined subcarrier at which a tone interference occurs, and
wherein the tone interference occurs at at least one constant position in a physical resource.

28. The method of claim 27, further comprising:
detecting a position at which the tone interference occurs; and
determining whether channel values adjacent to the channel value at which the tone interference occurs use a precoding that is the same as precoding used at the channel value corresponding to the position at which tone interference occurs.

29. The method of claim 28,
wherein if the channel value of the position at which the tone interference occurs has channel values on opposing adjacent sides that use the same precoding as the precoding used at the channel value of the position at which the tone interference occurs, then the compensating for the tone interference comprises compensating the channel value of the position at which the interference occurs based on channel values of the positions on opposing adjacent sides, and
wherein if the channel value of the position at which the tone interference occurs has only one adjacent channel value which uses the same precoding as the precoding used at the position at which interference occurs, then the compensating for the tone interference comprises compensating the channel value at which the interference occurs based on the channel value of the adjacent position which uses the same precoding as the precoding used at the position at which interference occurs.

30. The method of claim 27, wherein the compensating for the tone interference comprises compensating for the channel value by using one of interpolation, extrapolation, and Minimum Mean Square Error (MMSE) in conjunction with at least one channel value of a position at which the tone interference did not occur.

* * * * *